March 17, 1953     H. E. POUELL     2,632,154
AUDIBLE SIGNAL ATTACHMENT FOR MOTOR VEHICLE BACKING LIGHTS
Filed Aug. 20, 1951
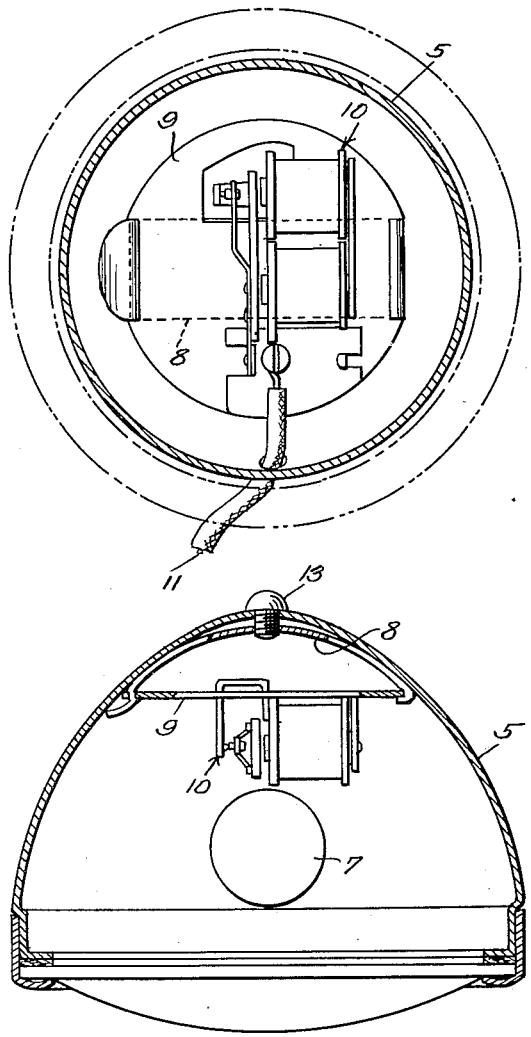
Fig.2.
Fig.3.
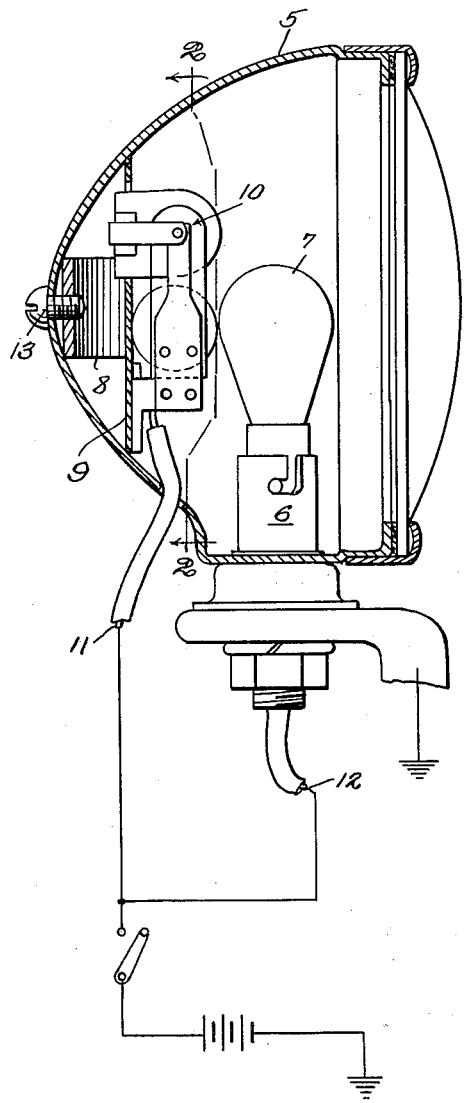
Fig.1.
Inventor
H. E. Pouell
By C. A. Snowles.
Attorneys.

Patented Mar. 17, 1953

2,632,154

UNITED STATES PATENT OFFICE 2,632,154

AUDIBLE SIGNAL ATTACHMENT FOR MOTOR VEHICLE BACKING LIGHTS

Harry E. Pouell, Logansport, Ind.

Application August 20, 1951, Serial No. 242,659

1 Claim. (Cl. 340—88)

This invention relates to backing lights for motor vehicles, the primary object of the invention being to provide a backing light having an auxiliary signal supported within the light housing and arranged in circuit with the usual backing light, so that an audible signal will be operated simultaneously with the lighting of the backing light to attract the attention of persons moving in proximity to the vehicle equipped with the backing light, indicating the intended backing movement of the vehicle.

An important object of the invention is to provide an audible signal for use in combination with the usual backing light of a motor vehicle, which may be sold as an accessory for ready attachment within a backing light housing, the attaching means being such that the audible signal may be readily and easily snapped into position, eliminating the necessity of making extensive alterations in the backing light housing construction, to mount the attachment.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing,

Figure 1 is a longitudinal sectional view through a backing light constructed in accordance with the invention.

Fig. 2 is a sectional view taken on line 2—2 of Fig. 1.

Fig. 3 is a transverse sectional view through the upper portion of the light.

Referring to the drawing in detail, the reference character 5 indicates the housing of the usual backing light of a motor vehicle, in which the lamp socket 6 is supported, which holds the backing lamp 7.

The audible signal, constituting the subject matter of the present invention, includes a spring clip 8 which is curved to fit within the curvature of the lamp housing, as clearly shown by the drawing, the clip having its ends bent inwardly to fit over the edge of the supporting plate 9 gripping the plate and removably securing the plate within the housing.

The audible signal embodies an electrically operated buzzer indicated by the reference character 10, the buzzer being grounded through the frame of the car, while the wire 11 which is connected in circuit with the buzzer coils, is also connected with the battery of the vehicle, through a switch mounted adjacent to the transmission control lever of the vehicle, so that when the transmission lever is moved to the reverse position, the buzzer will be energized to cause an audible signal.

The wire 12 which is in circuit with the lamp socket, is also connected with the usual backing light switch controlled by the transmission operating lever, so that the light and audible signal will be simultaneously operated to signal the movements of the vehicle, as well as illuminating the area in which the vehicle is being backed, thereby giving a warning to persons moving in back of the the vehicle, as to the intended movements of the vehicle.

From the foregoing it will be seen that due to the construction shown and described, the audible signal may be readily and easily removed and replaced, should it become defective through wear or otherwise rendered inoperative.

The spring clip 8 is provided with a threaded opening disposed intermediate its ends, which opening accommodates the securing screw 13 that passes through an opening formed in the rear of the housing 5, the screw 13 affording means whereby the clip may be readily and easily removed to facilitate the positioning of the audible signal therein, when it becomes necessary to remove and replace the audible signal.

From the foregoing it is believed that the operation and construction of applicant's attachment will be clearly understood, and that further description as to the construction and operation of the device is unnecessary.

Having thus described the invention, what is claimed is:

A backing light for motor vehicles, comprising a lamp housing, a backing light mounted within the housing, an audible signal comprising a supporting plate, a spring clip removably secured within the lamp housing adapted to grip said supporting plate, securing the audible signal within the lamp housing, said audible signal also including an electric buzzer, wires leading to the electric buzzer and light of the backing light, and a switch in circuit with said wires controlling the electric circuit between the audible signal, light and source of electricity supply whereby said audible signal and light are simultaneously operated upon the operation of said switch.

HARRY E. POUELL.

REFERENCES CITED

The following references are of record in the file of this patent:

UNITED STATES PATENTS

| Number | Name | Date |
|---|---|---|
| 723,845 | Dodd | Mar. 31, 1903 |
| 874,024 | McElroy | Dec. 17, 1907 |
| 1,394,046 | Swaney | Oct. 18, 1921 |
| 1,469,337 | Sanborn | Oct. 2, 1923 |
| 1,589,653 | Morris | June 22, 1926 |
| 2,220,222 | Duncan | Nov. 4, 1940 |